(12) United States Patent
Patil (10) Patent No.: US 9,734,234 B2
(45) Date of Patent: Aug. 15, 2017

(54) SYSTEM AND METHOD FOR RECTIFYING A TYPOGRAPHICAL ERROR IN A TEXT FILE

(71) Applicant: Tata Consultancy Services Limited, Mumbai, Maharashtra (IN)

(72) Inventor: Sangameshwar Suryakant Patil, Maharashtra (IN)

(73) Assignee: Tata Consultancy Services Limited, Mumbai, IN (US)

( * ) Notice: Subject to any disclaimer, the term of this patent is extended or adjusted under 35 U.S.C. 154(b) by 379 days.

(21) Appl. No.: 14/512,049

(22) Filed: Oct. 10, 2014

(65) Prior Publication Data

US 2015/0254327 A1    Sep. 10, 2015

(30) Foreign Application Priority Data

Mar. 7, 2014   (IN) .......................... 789/MUM/2014

(51) Int. Cl.
- *G06F 17/21* (2006.01)
- *G06F 17/30* (2006.01)
- *G06F 17/27* (2006.01)

(52) U.S. Cl.
CPC ...... *G06F 17/30598* (2013.01); *G06F 17/273* (2013.01); *G06F 17/2785* (2013.01);
(Continued)

(58) Field of Classification Search
CPC ............ G06F 17/30598; G06F 17/273; G06F 17/2785; G06F 17/30666; G06F 17/3071;
(Continued)

(56) References Cited

U.S. PATENT DOCUMENTS

| 5,933,822 A | 8/1999 | Braden-Harder et al. |
| 8,126,890 B2 | 2/2012 | Bobick et al. |

(Continued)

FOREIGN PATENT DOCUMENTS

| EP | 1571565 A2 | 9/2005 |
| EP | 2531930 A1 | 12/2012 |
| GB | 2338324 A | 12/1999 |

OTHER PUBLICATIONS

Ciszak et al. "A Method for Automatic Standardization of Text Attributes without Reference Data Sets", in Man-Machine Interactions, AISC59, pp. 489-496, Springer-Verlag Berlin Heigelberg 2009.*

Pandya etal., "Context Free Data Cleaning and its Applicationin Mechanism for Suggestive Data Cleaning", International Journal of Information Science: 2011; 1(1): 32-35.*

(Continued)

*Primary Examiner* — Stanley K Hill
*Assistant Examiner* — Tsu-Chang Lee
(74) *Attorney, Agent, or Firm* — Shumaker, Loop & Kendrick, LLP (57) ABSTRACT

Disclosed is a system for rectifying a typographical error in a text file. The system includes a network generating module for generating a linguistic network of a plurality of words present in the text file. A computation module configured to compute the similarity between each pair of words based on a set of parameters. A weight assignment module for assigning a weight to the edge present between the each pair of words based the set of parameters. A categorization module configured to categorize one or more words present in the linguistic network in a category. A word identification module configured to identify a reference word from the category. A word substitution module configured to substitute each word of the category deemed as erroneous with corresponding reference word for rectifying the typographical error.

13 Claims, 6 Drawing Sheets

(52) U.S. Cl.
CPC ...... *G06F 17/3053* (2013.01); *G06F 17/3071* (2013.01); *G06F 17/30091* (2013.01); *G06F 17/30666* (2013.01); *G06F 17/30958* (2013.01)

(58) Field of Classification Search
CPC ......... G06F 17/30958; G06F 17/30091; G06F 17/3053
See application file for complete search history.

(56) References Cited

U.S. PATENT DOCUMENTS

| | | |
|---|---|---|
| 8,285,719 B1 | 10/2012 | Long et al. |
| 2011/0238408 A1 | 9/2011 | Larcheveque et al. |
| 2013/0096911 A1* | 4/2013 | Beaufort ............... G06F 17/273 704/9 |

OTHER PUBLICATIONS

Yutaka Matsuo, et al., "Graph-based Word Clustering using a Web Search Engine", 2006.

Zhuowei Bao, et al., "A Graph Approach to Spelling Correction in Domain-Centric Search", Proceedings of the 49th Annual Meeting of the Association for Computational Linguistics, Jun. 19-24, 2011, pp. 905-914.

Stephan Gouws, et al., "Unsupervised Mining of Lexical Variants from Noisy Text", Proceedings of EMNLP Jul. 27-31, 2011, Conference on Empirical Methods in Natural Language Processing, pp. 82-90.

Paul Cook, et al., "An Unsupervised Model for Text Message Normalization", Proceedings of the NAACL HLT Workshop on Computational Approaches to Linguistic Creativity, Jun. 2009, pp. 71-78.

Majid Yazdani, et al., "Computing Text Semantic Relatedness using the Contents and Links of a Hypertext Encyclopedia", Artificial Intelligence, Nov. 19, 2012.

* cited by examiner

SYSTEM AND METHOD FOR RECTIFYING A TYPOGRAPHICAL ERROR IN A TEXT FILE

CROSS-REFERENCE TO RELATED APPLICATIONS

The present patent application claims priority from Indian Patent Application No. 789/MUM/2014, filed Mar. 7, 2014.

TECHNICAL FIELD

The present subject matter described herein, in general, relates to a system and method for rectifying a typographical error in a text file.

BACKGROUND

In an electronic era, computing systems play an important role in transforming data into useful information to derive a meaningful output. Examples of the data may include a text data, an image data, a video data and an audio data. The text data constitutes significant and influential content available on the Web and other data repositories. In one aspect, the text data may be received from a plurality of users accessing through the web by using a computing system. Example of the text data may comprise responses to surveys conducted on the Internet or intranet. In such scenario, the text data may be relevant in order to derive statistical inferences from the responses. In addition, some of the other major sources of the data that may be used for deriving the statistical inference are social platforms. Examples of the social platforms, may include, but not limited to, such as Facebook™, Twitter™, and LinkedIn®. However, it has been observed that, the text data in the form of the responses and the data received from the plurality of users may use colloquial or informal language in order to convey feelings share thoughts; provide opinions, suggestions and the like on the social platform. It may be understood that, the colloquial or informal language and tendency to use non-standard shorter forms of words, abbreviations etc. may be attributed to the advent of modern technologies of communication such as SMS (short messaging service), or 'SWYPE1®'. The SWYPE1® provides a method for using the colloquial or informal language through a hand held device for instant messaging/chatting on various web tools (such as Google's GTalk, Yahoo Messenger). In one aspect, the SWYPE1® enables the users to minimize or use fewer amounts of key-strokes that are needed to perform for conveying feelings sharing thoughts, providing opinions or suggestions. For example, the users may use: "gud" for "good", "pkg" for "package", "gr8" for "great", "4 u" for "for you", "LOL" for "Laughing out Loud", or "IMHO" for "In My Humble Opinion".

In addition to the social platforms, a lot of surveys are frequently conducted to derive the statistical inferences about population being studied. In order to make the statistical inferences, survey methodologies have been applied to collect data of individuals from the population. The data may be collected from the individual in the form of responses for a set of questionnaire. It may be understood that, the responses may be in the form of textual data that may contain certain typographical errors. Therefore, the informal/colloquial and the typographical error in the textual data need to be rectified before it is amenable for further automated text analysis in order to make statistical inferences.

However, various typographical error rectification methods and systems have been implemented that are aimed towards rectifying the typographical error. Some such systems for rectifying the typographical error are Microsoft® Word's spelling and grammar checker as well as open source like Open Office Writer, HunSpell, and Gnu Aspell. In such systems, each word in the text file may be compared with a lexicon to provide a list of possible replacement for the word that is deemed to be identified as a candidate word having the typographical error. In order to rectify the candidate word using such systems, the user has to intervene so as to decide if the candidate word is indeed having the typographical error. If the user identified that the candidate word is having the typographical error, an appropriate spelling correction from the list of suggested corrections by such systems may be selected by the user. It may be understood that, if the appropriate spelling correction may not present in the list, then user may correct the typographical error of the candidate word.

SUMMARY

Before the present system and method are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application. This summary is provided to introduce concepts related to systems and methods for rectifying typographical error in a text file and the concepts are further described below in the detailed description.

In one implementation, a system for rectifying a typographical error in a text file is disclosed. In one aspect, the system may include a processor and a memory coupled to the processor for executing a plurality of modules present in the memory. The plurality of modules may further include a network generating module, a computation module, a weight assignment module, a categorization module, a word identification module, and a word substitution module. The network generating module may be configured to generate a linguistic network of a plurality of words present in the text file. Each pair of words of the plurality of words in the linguistic network may be interconnected via an edge. After generating the linguistic network, the computation module may be configured to compute similarity between each pair of words based on based on a set of parameters associated with words of each pair. The set of parameters may include distance between the words, phonetic similarity between the words, presence of the words in lexicon, morphological root form of the words, frequency of the words in the text file, probability of occurrence of the words in the context, domain similarity of the words, and a flag associated to similar starting character of the words or their encodings such as phonetic encoding or consonant skeleton. Based on the computation of similarity between each pair of words, the weight assignment module may be configured to assign a weight to the edge present between the each pair of words based on the set of parameters. In one aspect, if the weight of the edge is less than a threshold, then the edge may be removed from the linguistic network. Subsequent to the assignment of the weight to the edge, the categorization module may be configured to categorize one or more words present in the linguistic network in a category. The one or more words may be categorized based on the weight assigned to each edge connecting the each pair of words of the one or more words. After categorizing the one or more words in the category, the word identification module may be configured to identify a word from the category which is deemed to have the typographical error. After identifying the word having the typographical error, the word identification module may further be configured to identify a reference word corresponding to the word having the typographical error. Based to the identification of the reference word, the word substitution module may be configured to substitute selected word of the category with the corresponding reference word in the text file in order to rectify the typographical error.

In another implementation, a method for rectifying a typographical error in a text file is disclosed. In one aspect, a linguistic network of a plurality of words present in the text file may be generated, wherein each pair of words of the plurality of words in the linguistic network may be interconnected via an edge. After generating the linguistic network, similarity between the each pair of words may be computed based on a set of parameters associated with words of each pair. The set of parameters may include distance between the words, phonetic similarity between the words, presence of the words in lexicon, morphological root form of the words, frequency of the words in the text file, probability of occurrence of the words in the context, domain similarity of the words, and a flag associated to similar starting character of the words or their encodings such as phonetic encoding or consonant skeleton. Based on the computation of the similarity, a weight may be assigned to the edge present between the each pair of words. The weight may be assigned based on the set of parameters. Subsequent to the assignment of the weight to the edge, one or more words present in the linguistic network may be categorized in a category, wherein the one or more words may be categorized based on the weight assigned to each edge connecting the each pair of words of the one or more words. After the categorizing the one or more words in the category, a word from the category which is deemed to have the typographical error may be identified. After identifying the word having the typographical error, a reference word corresponding to the word having the typographical error may be identified. Based to the identification of the reference word, each word of the category which is deemed to have the typographical error may be substituted with the corresponding reference word in the text file for rectifying the typographical error.

In yet another implementation, a non-transitory computer readable medium having embodied thereon a computer program including instructions for rectifying a typographical error in a text file is disclosed. The non-transitory computer readable medium may include instructions for generating a linguistic network of a plurality of words present in the text file. Each pair of words of the plurality of words in the linguistic network may be interconnected via an edge. The non-transitory computer readable medium may include instructions for computing similarity between the each pair of words based on a set of parameters associated with words of each pair. The set of parameters may include distance between the words, phonetic similarity between the words, presence of the words in lexicon, morphological root form of the words, frequency of the words in the text file, probability of occurrence of the words in the context, domain similarity of the words, and a flag associated to similar starting character of the words or their encodings such as phonetic encoding or consonant skeleton. The non-transitory computer readable medium may include instructions for assigning a weight to the edge present between the each pair of words based on the set of parameters. The non-transitory computer readable medium may include instructions for categorizing one or more words present in the linguistic network in a category. The one or more words are categorized based on the weight assigned to each edge connecting the each pair of words of the one or more words. The non-transitory computer readable medium may include instructions for identifying a word from the category which is deemed to have the typographical error. After identifying the word having the typographical error, the non-transitory computer readable medium may include instructions for identifying a reference word corresponding to the word having the typographical error. The non-transitory computer readable medium may include instructions for substituting each word of the category, which is deemed to have the typographical error with the corresponding reference word in the text file for rectifying the typographical error.

BRIEF DESCRIPTION OF THE DRAWINGS

The foregoing detailed description of embodiments is better understood when read in conjunction with the appended drawings. For the purpose of illustrating the disclosure, there is shown in the present document example constructions of the disclosure; however, the disclosure is not limited to the specific methods and apparatus disclosed in the document and the drawings. The same numbers are used throughout the drawings to refer to like features and components.

DETAILED DESCRIPTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings. In addition, the words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present disclosure, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

The present subject matter provides systems and methods for rectifying a typographical error in a text file. Examples of the text file may include, but not limited to, a word file, a PDF (Portable Document File), a text file, and the like. It may be understood that, the text file may include a plurality of words. The plurality of words may be used to generate a linguistic network. In one example, the linguistic network may be generated by interconnecting each pair of words of the plurality of words via an edge. It may be understood that, the edge present between the each pair of words may be assigned a weight. The weight may indicate a distance and a phonetic similarity between the each pair of words. In one aspect, the distance may be computed by transforming a first word to a second word of the each pair of words. It may be understood that, the first word may be transformed to the second word by inserting, deleting, substituting, transpositioning of characters present in the first word for deriving the second word. The phonetic similarity, on the other hand, may be computed by at least one of a metaphone algorithm, a double metaphone algorithm, Metaphone 3, Daitch-Mokotoff Soundex, Caverphone and the like.

After assigning the weight to the edge, one or more words in the linguistic network may be categorized in a category. It may be understood that, the category may comprise the one or more words based on the weight assigned to the edge. In other words, the category may comprise the one or more words that may have the phonetic similarity and less distance amongst the one or more words.

It may be understood that, a word from the category which is deemed to have the typographical error may be identified. After identifying the word having the typographical error, a reference word corresponding to the word having the typographical error may be identified. In one aspect, the reference word is a word that may be present in a lexicon vocabulary or may be phonetically similar to the word in the lexicon vocabulary. After identifying the reference word, each word of the one or more words in the category may be substituted with the reference word in the text file in order to rectify the typographical error. It may be understood that, each word of the category, that may have the typographical error, may be replaced with the reference word from the category corresponding to the word having the typographical error. In this manner, the typographical error in the text file may be rectified without any manual intervention.

While aspects of described system and method for rectifying a typographical error in a text file and may be implemented in any number of different computing systems, environments, and/or configurations, the embodiments are described in the context of the following exemplary system.

Figure 1:
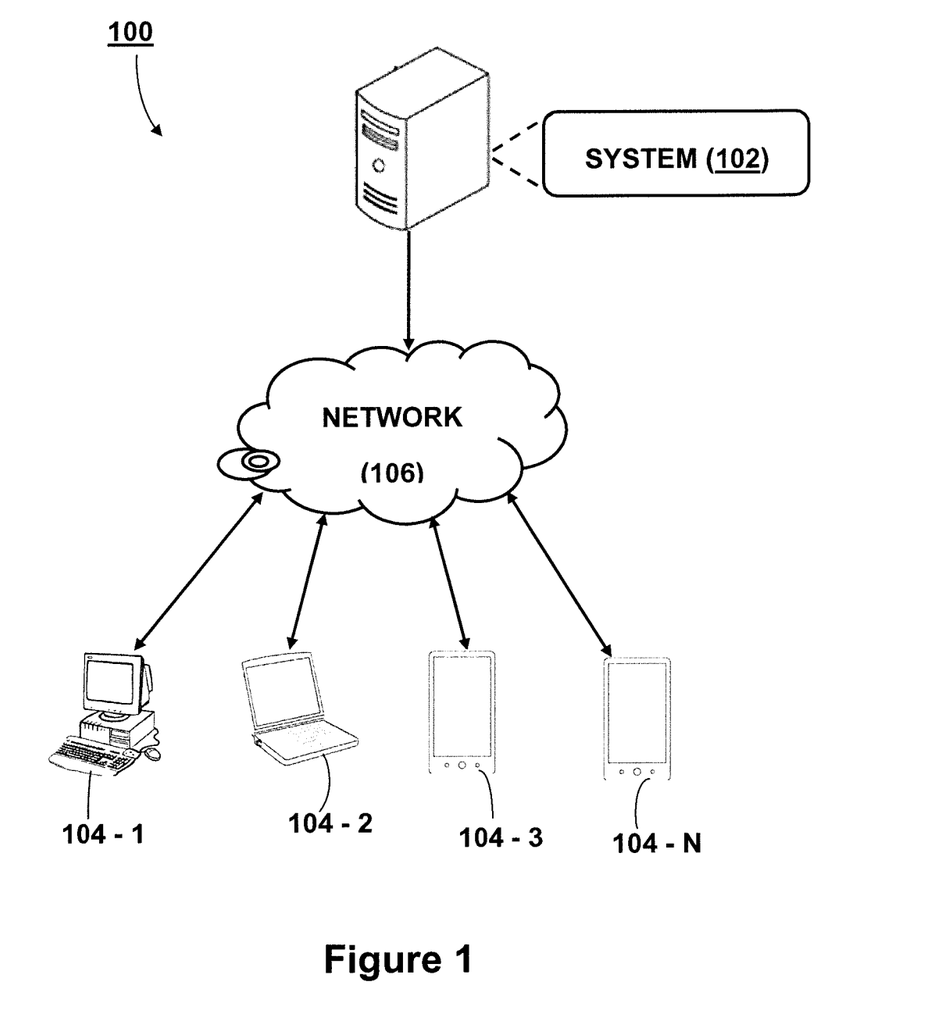
FIG. 1 illustrates a network implementation of a system for rectifying a typographical error in a text file, in accordance with an embodiment of the present subject matter.

Referring now to FIG. 1, a network implementation 100 of a system 102 for rectifying a typographical error in a text file is illustrated, in accordance with an embodiment of the present subject matter. In one embodiment, the system 102 may generate a linguistic network of a plurality of words present in the text file. Each pair of words of the plurality of words in the linguistic network is interconnected via an edge. In one aspect, if the words in the text file are not present in a lexicon but the words from lexicon have high similarity with the typographical error in the text file, then such words from lexicon may also added to the linguistic network. After generating the linguistic network, the system 102 may compute similarity between the each pair of words based on a set of parameters associated with words of each pair. The set of parameters may comprise distance between the words, phonetic similarity between the words, presence of the words in lexicon, morphological root form of the words, frequency of the words in the text file, probability of occurrence of the words in the given context, domain similarity of the words, and a flag associated to similar starting character of the words or their encodings such as phonetic encoding or consonant skeleton. Based on the computation of the similarity, the system 102 may assign a weight to the edge present between the each pair of words based on the set of parameters. Subsequent to the assignment of the weight, the system 102 may categorize one or more words present in the linguistic network in a category. After categorizing the one or more words in the category, the system 102 may identify a reference word for each word from the category which is not present in lexicon or which is deemed to be a typographical error. Subsequent to the identification of the reference word, the system 102 may substitute each word of the category, having the typographical error, with its corresponding reference word in the text file for rectifying the typographical error.

Although the present subject matter is explained considering that the system 102 is implemented on a server, it may be understood that the system 102 may also be implemented in a variety of computing systems, such as a laptop computer, a desktop computer, a notebook, a workstation, a mainframe computer, a server, a network server, a cloud-based computing environment and the like. In one implementation, the system 102 may comprise the cloud-based computing environment in which the user may operate individual computing systems configured to execute remotely located applications. It will be understood that the system 102 may be accessed by multiple users through one or more user devices 104-1, 104-2, 104-3, and 104-N, collectively referred to as user devices 104 hereinafter referred also to as client devices 104, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
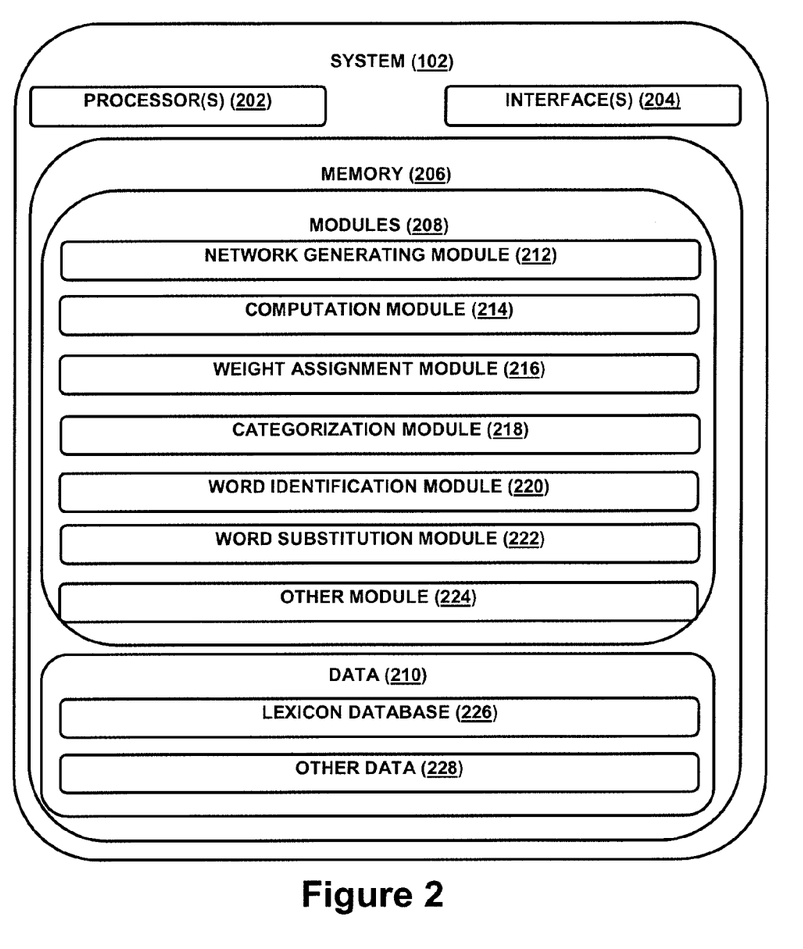
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a network generating module 212, a computation module 214, a weight assignment module 216, a categorization module 218, a word identification module 220, a word substitution module 222 and other modules 224. The other modules 224 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a lexicon database 226 and other data 228. The other data 228 may include data generated as a result of the execution of one or more modules in the other modules 224.

In one implementation, at first, a user may use the client devices 104 to access the system 102 via the I/O interface 204. The user may register themselves using the I/O interface 204 in order to use the system 102. In one aspect, the user may accesses the I/O interface 204 of the system 102 for rectifying a typographical error in a text file. Examples of the text file may include, but not limited to, a word file, a PDF (Portable Document File), a text file, and the like. It may be understood that, the text file may include a plurality of words. In order to in order to rectify the typographical error of the plurality of words in the text file, the system 102 may employ the network generating module 212, the computation module 214, the weight assignment module 216, the categorization module 218, the word identification module 220, and a word substitution module 222. The detailed working of the plurality of modules is described below.

Referring to FIG. 2, at first, the network generating module 212 may generate a linguistic network of the plurality of words present in the text file. The linguistic network may be generated by interconnecting the plurality of words by a plurality of edges. It may be understood that, each pair of words of the plurality of words in the linguistic network may be interconnected via an edge. In one aspect, the linguistic network may be generated by using various software tools or using standard graph data structures in customized code. Examples of the software tools may include, but not limited to, NodeXL Pajek, UCINet, NetworkX and Gephi.

Figure 3A:
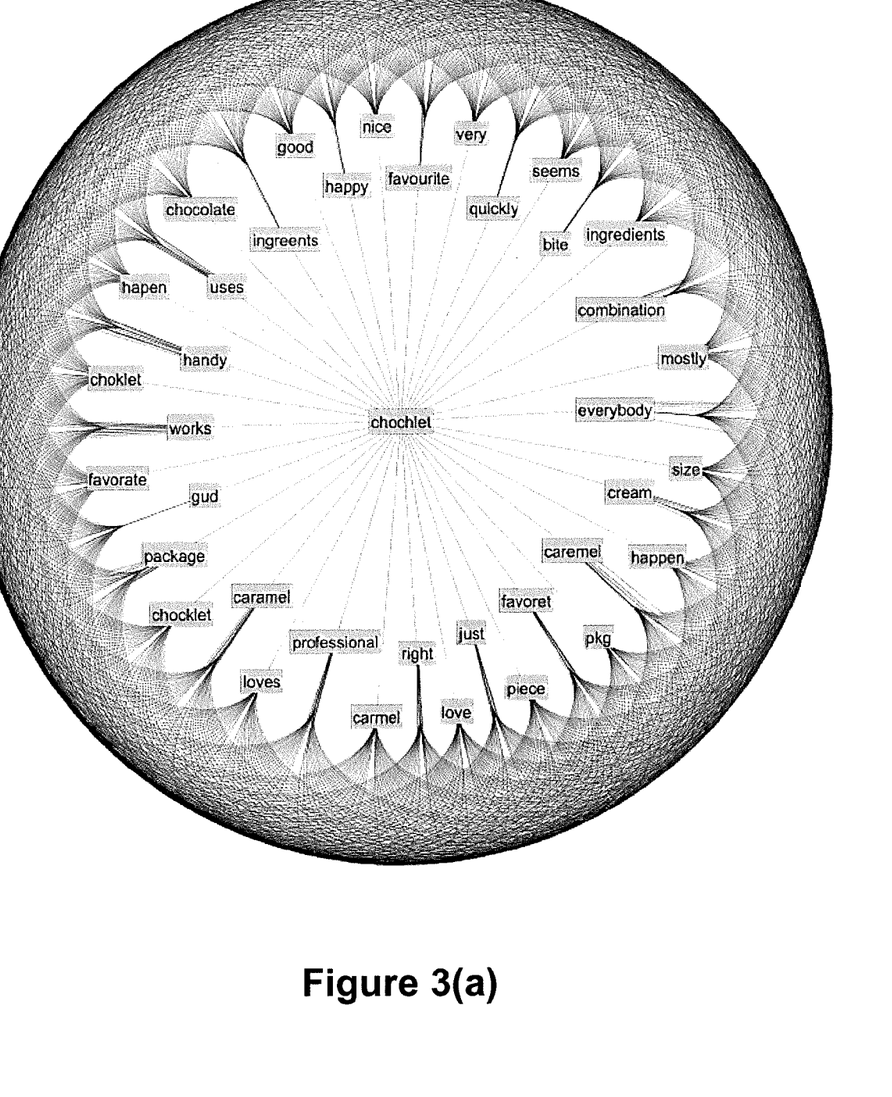
FIGS. 3(a)-3(c) are examples of the system 102, in accordance with one or more embodiments of the present subject matter.

Now, in order to understand a working of the network generating module 212, consider a following example (1), where a set of responses may be received from a plurality of users in an online survey conducted related to food category. It may be understood that, the set of responses may have typographical error. In one aspect, the set of responses may comprise:

1: chocklet with caremel, this hapen to be my favoret, i mostly love caremel, very good size in piece
2: everybody loves chochlet
3: I like the combination of chocolate and caramel
4: It is in a handy pkg, & nice bite size. Love chocolate & carmel.
5: happen to be favourite package
6: it was gud. choklet cream is favorate. happy
7: it seems to have just the right ingreents
8: uses professional ingredients and works quickly Since the one or more words (i.e. "chocklet", "caremel", "hapen", "favoret", "chochlet", "pkg", "carmel", "favourite", "gud", "choklet", "favorate", and "ingreents") are not present in the lexicon, therefore the one or more words are deemed to have the typographical error. In order to rectify the typographical error, the network generating module 212 may generate a linguistic network as illustrated in FIG. 3(a). The plurality of words, as appeared in the set of responses, may be linked with a plurality of edges in the linguistic network. Each pair of words of the plurality of words in the linguistic network is interconnected via an edge of the plurality of edges.

In one aspect, after generating the linguistic network, the computation module 214 may compute similarity between the each pair of words based on a set of parameters associated with words of each pair. The set of parameters may comprise distance between the words, phonetic similarity between the words, presence of the words in lexicon, morphological root form of the words, frequency of the words in the text file, probability of occurrence of the words in the context, domain similarity of the words, and a flag associated to similar starting character of the words or their encodings such as phonetic encoding or consonant skeleton. It may be understood that, the distance between the each pair of words may be computed for the edge connecting the each pair of words. In one embodiment, the distance may be computed by counting a minimum number of operations needed to transform a first word to a second word. The minimum number of operations may include insertion, deletion, substitution of a single character of the first word into the second word, or a transposition of two adjacent characters of the first word and the second word in the each pair of words. Therefore the minimum number of operations, when performed, may compute the distance between the each pair of words. A few techniques of computing the distance may include, but not limited to, weighted Damerau-Levenshtein distance, Hamming distance, Levenshtein distance, Jaro-Winkler distance. In one aspect, the distance and the weights for the operations like insertion, deletion, substitution, and transposition may be different from each other. The weights may be pre-specified or they may also be learnt from a noisy-channel error model.

The phonetic similarity, on the other hand, may be computed through indexing of the each pair of words by their pronunciation. Example of various algorithms for computing the phonetic similarity may include, but not limited to, Metaphone, Double Metaphone, Metaphone 3, Daitch-Mokotoff Soundex, Caverphone and the like. In this manner, the distance and the phonetic similarity may be computed for the edge connecting the each pair of words in the linguistic network.

Subsequent to the computation of the distance and the phonetic similarity, the weight assignment module 216 may assign a weight to the edge present between the each pair of words. In one aspect, the weight may be assigned based on the at least one of the distance and the phonetic similarity between the each pair of words. In one embodiment, the similarity between two words, denoted by w1 and w2, is determined based on the set of parameters (such as distance between the words, phonetic similarity between the words, presence of the words in lexicon, morphological root form of between the words, frequency of between the words in the text file, probability of occurrence of the words in the context, domain similarity of the words, and a flag associated to similar starting character of the words) as defined below:

editDistFrac1=(Weighted edit distance between w1 and w2)/length(w1)

editDistFrac2=(Weighted edit distance between w1 and w2)/length(w2)

lexiconPresenceFlag=1 if both w1 and w2 are present in the reference lexicon for a language (else lexiconPresenceFlag=0).

phoneticDistance=minimum of edit distance between the phonetic encodings of w1 and w2. In one aspect, the phoneticDistance may be obtained by using at least one of a metaphone, a double metaphone, a soundex, a caperphone.

consonantSkeletonDistance=edit distance between the consonant skeleton of the words w1 and w2. (Consonant skeleton of a word is obtained by first removing any consecutively repeating characters from the words and then removing all the vowels).

sameStartCharacterFlag=1 if both w1 and w2 start with same character of the alphabet (otherwise sameStartCharacterFlag=0)

wordFreq1=frequency of word w1 in the input file (or set of survey responses).

wordFreq2=frequency of word w2 in the input file (or set of survey responses).

domainSimilarity=inverse of the difference between similarity values of word w1 and w2 with the domain of input file (or set of survey responses) computed using lexical databases such as the WordNet™.

languageModelFlag=1 if the difference in probabilities of occurrence of w1 and w2 in the context of their respective locations (within the sentence/phrase in the input file) using a language model exceeds a fraction of their individual occurrence probabilities as predicted by the language model. Else, languageModelFlag=0.

Based on the aforementioned description, the weight of the edge connecting words w1 and w2 may be given as per the following function:

Weight of the edge (w1, w2)=f(editDistFrac1, editDistFrac1, lexiconPresenceFlag, phoneticDistance, consonantSkeletonDistance, sameStartCharacterFlag, domainSimilarity, languageModelFlag)

In order to explain the aforementioned method of assigning the weight to the edge (w1, and w2), consider the example (1) as aforementioned.

1: chocklet with caremel, this hapen to be my favoret, i mostly love caremel, very good size in piece
2: everybody loves chochlet
3: I like the combination of chocolate and caramel
4: It is in a handy pkg, & nice bite size. Love chocolate & carmel.
5: happen to be favourite package
6: it was gud. choklet cream is favorate. happy
7: it seems to have just the right ingrents
8: uses professional ingredients and works quickly In order to rectify the typographical error in the set of responses, the network generating module 212, initially, generate a linguistic network of a plurality of words present in the responses (i.e. 1 to 8), as illustrated in FIG. 3(*a*). Further, the computation module 214 may compute similarity between each pair of words based on a set of parameters associated with words of each pair. The set of parameters may comprise distance between the words, phonetic similarity between the words, presence of the words in lexicon, morphological root form of the words, frequency of the words in the text file, probability of occurrence of the words in the context, domain similarity of the words, and a flag associated to similar starting character of the words or their encodings such as phonetic encoding or consonant skeleton. After computing the similarity between each pair of words, the weight assignment module 216 may assign a weight to the edge present between the each pair of words based on the set of parameters. In one aspect, the weight may be computed by using a function i.e. Weight of the edge (w1, w2)=f(editDistFrac1, editDistFrac1, lexiconPresenceFlag, phoneticDistance, consonantSkeletonDistance, sameStartCharacterFlag, domainSimilarity, languageModelFlag).

Figure 3B:
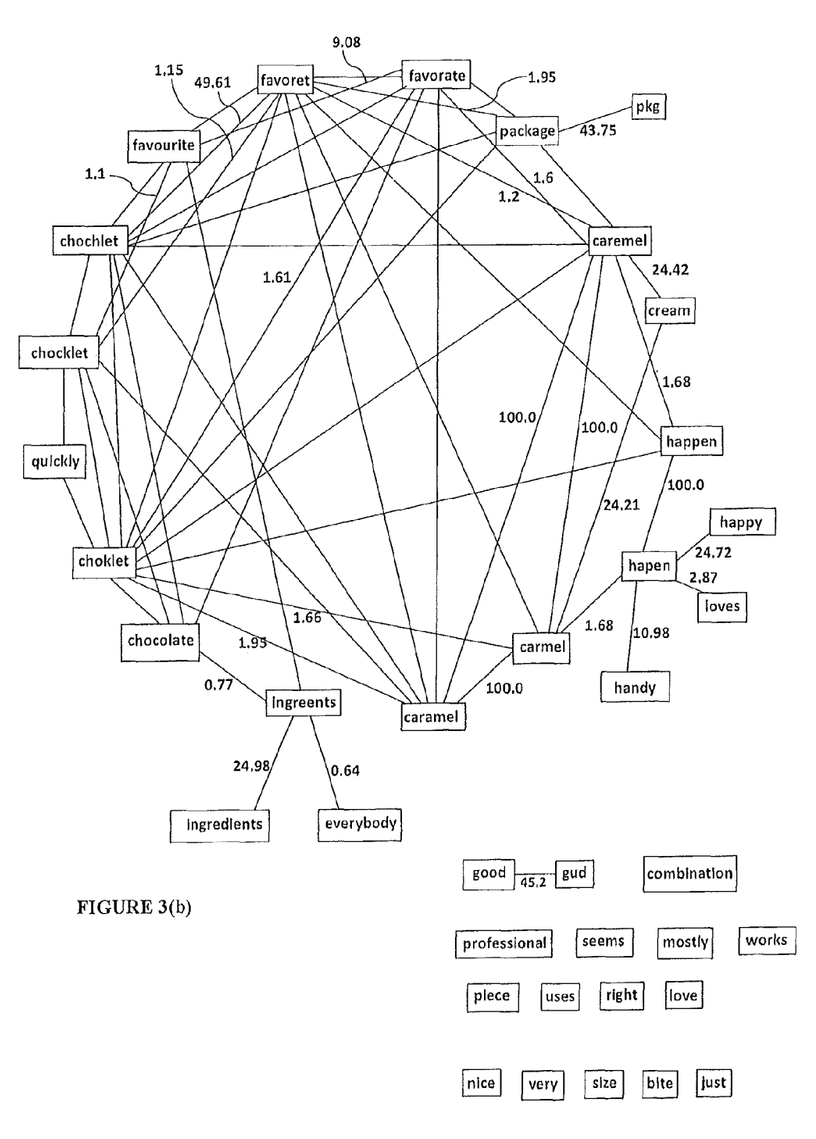

In one embodiment, a graph sparsification technique may be executed on the linguistic network in order to simplify the linguistic network by eliminating one or more edges. In one aspect, the graph sparsification technique may eliminate each edge from the linguistic network having a weight '0' or less than a pre-defined threshold value. After eliminating the one or more edges, the linguistic network comprising may be simplified as illustrated in FIG. 3(*b*).

Based on the assignment of the weight to each edge, the categorization module 218 may categorize one or more words present in the linguistic network in a category. In one aspect, the category may comprise the one or more words that may have the phonetic similarity and having less distance amongst the each pair of words. It may be understood that, the one or more words may be categorized based on the weight assigned to the each edge connecting the each pair of words in the category. In one embodiment, the one or more words may be categorized by running a community detection algorithm on the weight assigned to each edge. Example of the community detection algorithm may include, but not limited to, a minimum-cut method, a hierarchical clustering, a Girvan-Newman algorithm, a modularity maximization, a clique based methods.

Figure 3C:
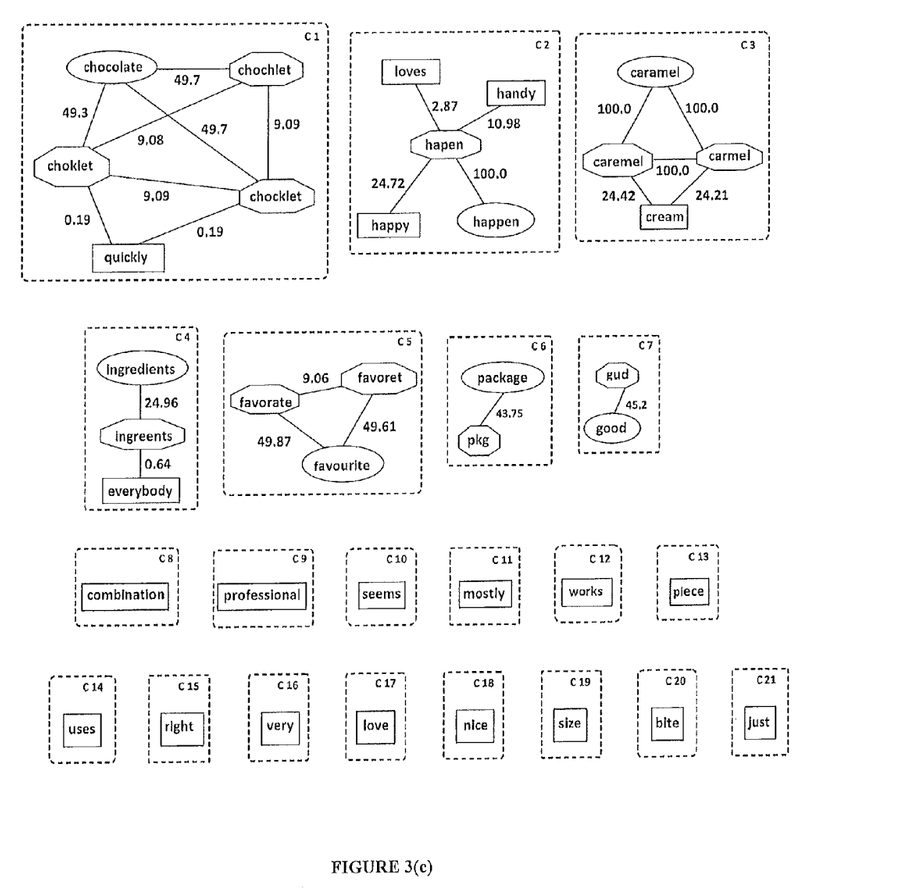

In one embodiment, the graph sparsification technique and the community detection technique may be executed on the linguistic network. Based on the execution of the graph sparsification technique and the community detection technique on the linguistic network, one or more communities may be determined as illustrated in FIG. 3(*c*) in which each community is shown using set of connected nodes. In one embodiment, further referring to example (1), the categorization module 218 categorizes the one or more words, i.e. "chocolate-chochlet-choklet-chocklet-quickly" in a first category. Similarly, "loves-handy-hapen-happy-happen" are categorized in a second category. Further, "Caramel-caremel-carmel-cream" is categorized in a third category. Further "ingredients-ingreents-everybody" are categorized in a fourth category, as illustrated in FIG. 3(c). It may be understood that, the first category, the second category, the third category and the fourth category may be categorized based on the weight assigned to the each edge connecting the one or more pairs of words in the linguistic network.

Subsequent to the categorization of the one or more words, the word identification module 220 may identify a word from the category which is deemed to have the typographical error. After identifying the word having the typographical error, the word identification module may further identify a reference word corresponding to the word which is deemed to have the typographical error in the category. For example consider a word 'w1' having the typographical error. If there is another word 'w2' (connected with an edge to the word 'w1') in the same category and the word 'w2' is present in the lexicon and has significantly higher similarity weight compared to other words connected to word 'w1' within the category; then the word 'w2' is chosen as the reference word for the word 'w1' having the typographical error. Further, the weight of the edge connecting the words 'w1' and 'w2' is considered as significantly higher than weight of other edges incident on the word 'w1' if the weight of the edge connecting the word 'w1' and the word 'w2' is higher than other individual edge weights or it is higher than the average of weights of other edges incident on the word 'w1'. If there is no such word 'w2' within the category, then the reference word 'w3' from lexicon database may be selected by computing the at least one of distance and phonetic similarity. If the phonetic similarity between 'w1' and 'w3' is high, that is one of the phonetic encodings of 'w1' and 'w3' match, then 'w3' is retained as a reference word for 'w1'. Further, if the reference word is not identified based on the approach as aforementioned, then a centroid based approach may be used as described below. In one embodiment, each word of the category that is lexicographically and phonetically closest to the centroid of the community may be identified as the reference word.

In one aspect, the centroid of the community may be computed by using a weighted average of a set of parameters associated to the each word of the category. The set of parameters may include:

asIsWord: The word as it appears in the text file.

A flag to denote if the asIsWord is present in the lexicon.

rootForm: Morphological root form of the word if available in the lexicon consonant skeleton of the word: Consonant skeleton of a word is obtained by first removing any consecutively repeating characters from the words and then removing all the vowels.

Number of occurrences: Total number of times the word appears in the text file.

Double Metaphone based encoding of the asIsWord.

Double Metaphone based encoding of the rootForm of the asIsWord.

Domain Similarity: similarity of the word with the domain of input file (or set of survey responses) computed using lexical databases such as the WordNet.

Language Model Probability: probability of occurrence of the word in the context of its location (within the sentence/phrase in the input file) using a language model.

In order to understand a working of the word identification module 220 and the word substitution module 222, consider the example (1) same as aforementioned. It may be understood that, the first category includes "chocolate-chochlet-choklet-chocklet-quickly". Since, that the word 'chochlet' is not present in the lexicon vocabulary, therefore the word 'chochlet' is deemed to have the typographical error. In order to rectify the typographical error, the word identification module 220 may identify the reference word from the category 'C1'. As illustrated in the FIG. 3(c) that, 'chochlet' is connected via two edges with 'chocolate' and 'chocklet' respectively, the word identification module 220 is adapted to verify whether 'chocolate' and 'chocklet' is present in the lexicon vocabulary. Based on the verification, it is to be understood that, 'chocolate' is present in the lexicon vocabulary whereas 'chocklet' is not present in the lexicon vocabulary. In addition, the word identification module 220 also compares the weight assigned to the two edges (i.e. an edge connecting 'chochlet'-'chocolate' and another edge connecting 'chochlet'-'chocklet') in order to determine the significantly higher weight amongst the two edges. Therefore, based on the presence of the word in the lexicon vocabulary and the edge with highest weight, the word identification module 220 identifies 'chocolate' as the reference word for the word 'chochlet' in the category 'C1'. Thereafter, the word substitution module 222, after identifying the reference word, substitute 'chochlet' with 'chocolate' in the set of responses in order to rectify the typographical error.

Similarly, in the category 'C2', a word 'hapen' is not present in the lexicon vocabulary, therefore 'happen' is deemed to have the typographical error. In order to rectify the typographical error, the word identification module 220 may identify the reference word from the category 'C2'. As illustrated in the FIG. 3(c) that, 'hapen' is connected via an edge with 'loves', 'handy', 'happy' and 'happen', the word identification module 220 is adapted to verify 'loves', 'handy', 'happy' and 'happen' are present in the lexicon vocabulary. Based on the verification, it is to be understood that, 'loves', 'handy', 'happy' and 'happen' are present in the lexicon vocabulary. In order to identify the reference word amongst 'loves', 'handy', 'happy' and 'happen', the word identification module 220 compares the weight of four edges connecting 'hapen'-'loves', 'hapen'-'handy', 'hapen'-'happy', and 'hapen'-'happen' respectively. The weights of the four edges are then compared with each other in order to determine the edge with significantly higher weight amongst the four edges. The weight of the edge connecting the words 'hapen and 'happen' is considered to be significantly higher than the weights of other edges incident on the word 'hapen' because the weight of the edge 'hapen'-'happen' is higher than all other individual weights of the edges incident on the word 'hapen' and it is more than the twice of the average of weights of other edges incident on the word 'hapen'. Thus, because the edge connecting 'hapen'-'happen' is assigned with the highest weight and also the word 'happen' is present in the lexicon vocabulary, the word identification module 220 identifies 'happen' as the reference word for the word 'hapen' in the category 'C2'. Thereafter, the word substitution module 222, after identifying the reference word, substitute 'happen' with 'hapen' in the set of responses in order to rectify the typographical error.

In one embodiment, as illustrated in FIG. 3(c), it may be understood that, oval nodes comprise the reference word, octagonal nodes comprise words having the typographical error, and rectangular nodes comprise words which are not changed (i.e. kept as-is).

Exemplary embodiments discussed above may provide certain advantages. Though not required to practice aspects of the disclosure, these advantages may include those provided by the following features.

Some embodiments enable a system and a method for rectifying the typographical errors in a text file without any manual intervention.

Some embodiments enable various techniques from linguistic networks and social network analysis to achieve unsupervised spelling error correction of a set of informal, noisy text.

Figure 4:
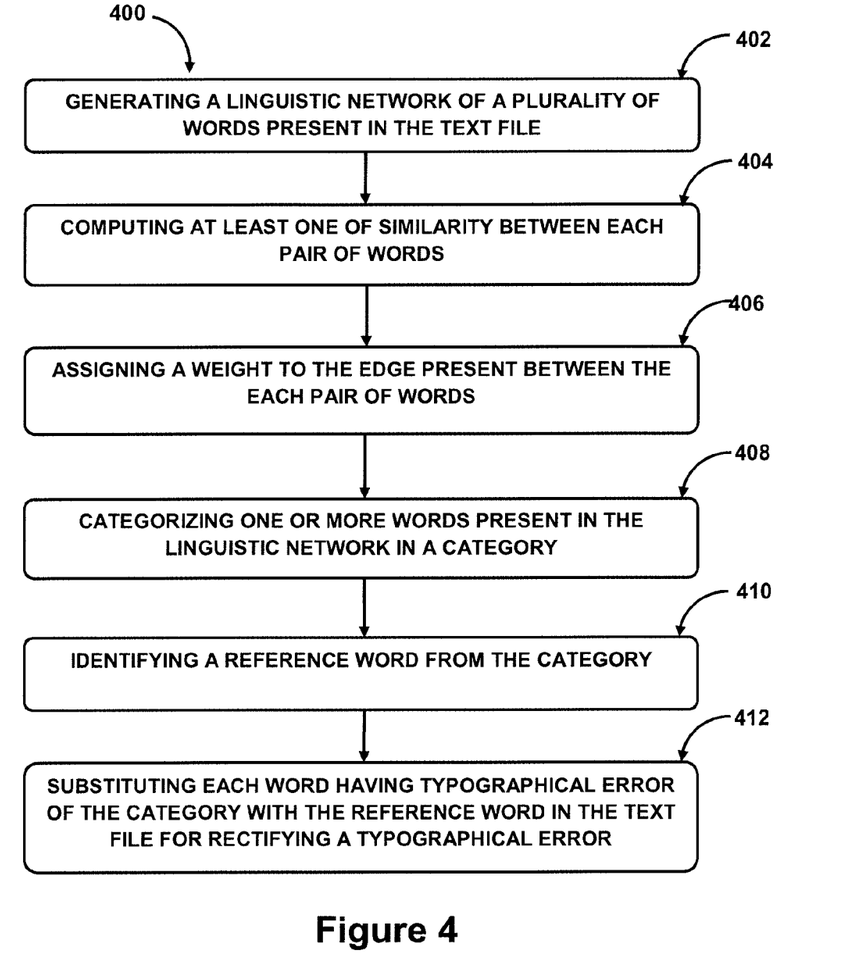
FIG. 4 illustrates a method for rectifying the typographical error in the text file, in accordance with an embodiment of the present subject matter.

Referring now to FIG. 4, a method 400 for rectifying a typographical error in a text file is shown, in accordance with an embodiment of the present subject matter. The method 400 may be described in the general context of computer executable instructions. Generally, computer executable instructions can include routines, programs, objects, components, data structures, procedures, modules, functions, etc., that perform particular functions or implement particular abstract data types. The method 400 may also be practiced in a distributed computing environment where functions are performed by remote processing devices that are linked through a communications network. In a distributed computing environment, computer executable instructions may be located in both local and remote computer storage media, including memory storage devices.

The order in which the method 400 is described is not intended to be construed as a limitation, and any number of the described method blocks can be combined in any order to implement the method 400 or alternate methods. Additionally, individual blocks may be deleted from the method 400 without departing from the spirit and scope of the subject matter described herein. Furthermore, the method can be implemented in any suitable hardware, software, firmware, or combination thereof. However, for ease of explanation, in the embodiments described below, the method 400 may be considered to be implemented as described in the system 102.

At block 402, a linguistic network of a plurality of words present in the text file may be generated. In one aspect, each pair of words of the plurality of words in the linguistic network may be interconnected via an edge. In one implementation, the linguistic network may be generated by the network generating module 212.

At block 404, similarity between each pair of words may be computed based on a set of parameters associated with words of each pair, wherein the set of parameters comprises distance between the words, phonetic similarity between the words, presence of the words in lexicon, morphological root form of the words, frequency of the words in the text file, probability of occurrence of the words in the context, domain similarity of the words, and a flag associated to similar starting character of the words or their encodings such as phonetic encoding or consonant skeleton. In one implementation, the at least one of the distance and the phonetic similarity may be computed by the computation module 214.

At block 406, a weight may be assigned to the edge present between the each pair of words. In one aspect, the weight may be assigned based on the set of parameters. In one implementation, the weight may be assigned by the weight assignment module 216. In one embodiment, the edges having weight less than a predefined threshold value may be removed from the linguistic network.

At block 408, one or more words present in the linguistic network may be categorized in a category. In one aspect, the one or more words may be categorized based on the weight assigned to each edge connecting the each pair of words of the one or more words. In one implementation, the one or more words may be categorized in the category by the categorization module 218.

At block 410, a word from the category which is deemed to have the typographical error may be identified. After identifying the word having the typographical error, a reference word corresponding to the word having the typographical error may be identified. In one implementation, the reference word may be identified by the word identification module 220.

At block 412, each word of the category having the typographical error may be substituted with the corresponding reference word in the text file for rectifying the typographical error. In one implementation, the each word may be substituted by the word substitution module 222.

Although implementations for methods and systems for rectifying the typographical error in the text file have been described in language specific to structural features and/or methods, it is to be understood that the appended claims are not necessarily limited to the specific features or methods described. Rather, the specific features and methods are disclosed as examples of implementations for rectifying the typographical error in the text file.

I claim:

1. A method for rectifying a typographical error in a text file, the method comprising:

generating a linguistic network of a plurality of words present in the text file, wherein each pair of words of the plurality of words in the linguistic network is interconnected via an edge;

computing similarity between each pair of words based on a set of parameters associated with words of each pair, wherein the set of parameters comprises distance between the words, phonetic similarity between the words, consonant skeleton distance, presence of the words in lexicon, morphological root form of the words, frequency of the words in the text file, probability of occurrence of the words in the context, domain similarity of the words, and a flag associated to similar starting character of the words;

assigning a weight to the edge between the each pair of words based on the similarity computed from the set of parameters;

categorizing one or more words present in the linguistic network in a category, wherein the one or more words are categorized based on the weight assigned to each edge connecting the each pair of words of the one or more words;

identifying a reference word for each word which is deemed to have the typographical error from the category; and substituting each word of the category, having the typographical error, with the reference word corresponding to the word having typographical error in the text file for rectifying the typographical error, wherein the generating, the computing, the assigning, the categorizing, the identifying and the substituting are performed by a processor using programmed instructions stored in a memory.

2. The method of claim 1, wherein computing the distance comprises:
    transforming a first word to a second word of the each pair of words by inserting, deleting, substituting, transpositioning characters present in the first word.

3. The method of claim 1, wherein the phonetic similarity is computed by at least one of a metaphone algorithm, a double metaphone algorithm, a Metaphone 3, a Daitch-Mokotoff and a Soundex, Caverphone.

4. The method of claim 1, wherein the categorizing comprising running a community detection algorithm on the weight assigned to the edge connecting one or more pairs of words of the one or more words and wherein the community detection algorithm may be selected from a group comprising a minimum-cut method, a hierarchical clustering, a Girvan-Newman algorithm, a modularity maximization, and a clique based methods.

5. The method of claim 1, wherein the identification of the reference word is based on the set of parameters, and wherein the identifying further comprises:
    comparing each word of the category with a lexicon vocabulary to verify at least one word of the category is present in the lexicon vocabulary, wherein the at least one word is assigned a flag, and wherein the flag associated to the at least one word is indicated as the reference word; or
    selecting the reference word from the lexicon database by computing the at least one of the distance and the phonetic similarity between each word of the category and the lexicon vocabulary, wherein the reference word is selected when the at least one word of the category is not present in the lexicon database; or
    determining a number of instances associated to each word of the category in the text file, wherein the number of instances is determined to select the reference word having highest number of instances in the text file and wherein the number of instances is determined when the reference word is not selected based on the computing.

6. The method of claim 5, wherein the lexicon vocabulary is stored in a lexicon database.

7. The method of claim 1 further comprising executing a graph sparsification technique on the linguistic network after assigning the weight to the edge present between the each pair of words in the linguistic network, wherein the graph sparsification technique facilitates in simplifying the linguistic network by eliminating one or more edges of the linguistic network having the weight 0 or less than a predefined threshold value.

8. A system for rectifying a typographical error in a text file, the system comprising:
    a processor; and
    a memory coupled to the processor, wherein the processor is capable of executing a plurality of modules stored in the memory, and wherein the plurality of module comprising:
        a network generating module configured to generate a linguistic network of a plurality of words present in the text file, wherein each pair of words of the plurality of words in the linguistic network is interconnected via an edge;
        a computation module coupled to the network generating module, the computation module configured to compute similarity between the each pair of words based on a set of parameters associated with words of each pair, wherein the set of parameters comprises distance between the words, phonetic similarity between the words, consonant skeleton distance, presence of the words in lexicon, morphological root form of the words, frequency of the words in the text file, probability of occurrence of the words in the context, domain similarity of the words, and a flag associated to similar starting character of the words;
        a weight assignment module configured to assign a weight to the edge between the each pair of words based on the similarity computed from the set of parameters;
        a categorization module configured to categorize one or more words present in the linguistic network in a category, wherein the one or more words are categorized based on the weight assigned to each edge connecting the each pair of words of the one or more words;
        a word identification module configured to identify a reference word for each word which is deemed to have the typographical error from the category; and
        a word substitution module configured to substitute each word of the category, having the typographical error, with the corresponding reference word in the text file for rectifying the typographical error.

9. The system of claim 8, wherein the computation module is further configured to compute the distance by transforming a first word to a second word of the each pair of words by inserting, deleting, substituting, transpositioning characters present in the first word.

10. The system of claim 8, wherein the computation module is further configured to compute the phonetic similarity by at least one of a metaphone algorithm, a double metaphone algorithm, a Metaphone 3, a Daitch-Mokotoff Soundex, and a Caverphone.

11. The system of claim 8, wherein the word identification module is further configured to:
    compare each word of the category with a lexicon vocabulary to verify at least one word of the category is present in the lexicon vocabulary, wherein the at least one word is assigned a flag, and wherein the flag associated to the at least one word is indicated as the reference word; or
    select the reference word from the lexicon database by computing the at least one of the distance and the phonetic similarity between each word of the category and the lexicon vocabulary, wherein the reference word is selected when the at least one word of the category is not present in the lexicon database; or
    determine a number of instances associated to each word of the category in the text file, wherein the number of instances is determined to select the reference word having highest number of instances in the text file and wherein the number of instances is determined when the reference word is not selected based on the computing.

12. The system of claim 11, wherein the lexicon vocabulary is stored in a lexicon database.

13. A non-transitory computer readable medium having embodied thereon a computer program for rectifying a typographical error in a text file, the computer program comprising instructions for:
    generating a linguistic network of a plurality of words present in the text file, wherein each pair of words of the plurality of words in the linguistic network is interconnected via an edge;
    computing similarity between the each pair of words based on a set of parameters associated with words of each pair, wherein the set of parameters comprises distance between the words, phonetic similarity between the words, consonant skeleton distance, presence of the words in lexicon, morphological root form of the words, frequency of the words in the text file, probability of occurrence of the words in the context, domain similarity of the words, and a flag associated to similar starting character of the words;

assigning a weight to the edge between the each pair of words based on the similarity computed from the set of parameters;

categorizing one or more words present in the linguistic network in a category, wherein the one or more words are categorized based on the weight assigned to each edge connecting the each pair of words of the one or more words;

identifying a reference word for each word which is deemed to have the typographical error from the category; and substituting each word of the category, having the typographical error, with the corresponding reference word in the text file for rectifying the typographical error.

* * * * *